United States Patent [19]

Stone

[11] Patent Number: 5,228,334
[45] Date of Patent: Jul. 20, 1993

[54] PRESSURE TRANSDUCER

[75] Inventor: John R. Stone, Mansfield, Ohio

[73] Assignee: Hi-Stat Manufacturing Co., Inc., Sarasota, Fla.

[21] Appl. No.: 860,326

[22] Filed: Mar. 30, 1992

Related U.S. Application Data

[63] Continuation of Ser. No. 635,206, Dec. 28, 1990, abandoned.

[51] Int. Cl.[5] .......................................... G01M 15/00
[52] U.S. Cl. ........................................ 73/115; 73/707
[58] Field of Search ........................... 73/706, 707, 115

[56] References Cited

U.S. PATENT DOCUMENTS

| | | | |
|---|---|---|---|
| 635,523 | 10/1899 | Swenson | 73/707 |
| 1,022,843 | 3/1927 | Price et al. | 73/707 |
| 1,619,444 | 3/1927 | Taylor | 73/707 |
| 1,941,613 | 1/1934 | McDonell | 73/707 |
| 4,079,278 | 1/1988 | Levine | 338/36 |
| 4,413,524 | 11/1983 | Kosh | 73/707 |
| 4,718,278 | 1/1988 | Bergsma | 73/725 |

FOREIGN PATENT DOCUMENTS

| | | | |
|---|---|---|---|
| 13850 | 1/1909 | United Kingdom | 73/707 |
| 10672 | 12/1909 | United Kingdom | 73/707 |

Primary Examiner—Robert Raevis
Attorney, Agent, or Firm—Lon H. Romanski

[57] ABSTRACT

A pressure transducer is shown having a pressure responsive movable diaphragm which effectively forms a wall of a pressure chamber; the diaphragm upon sensing fluid pressure thereagainst is effective for accordingly varying an electrical resistance; a passage operatively interconnects the pressure chamber with a source of fluid whereby the fluid and its pressure are communicated to the pressure chamber; the passage is shown as being helically formed in order to, within a limited axial length about which the helical passage is formed, sufficiently damp perturbations in the pressure of the fluid.

12 Claims, 5 Drawing Sheets

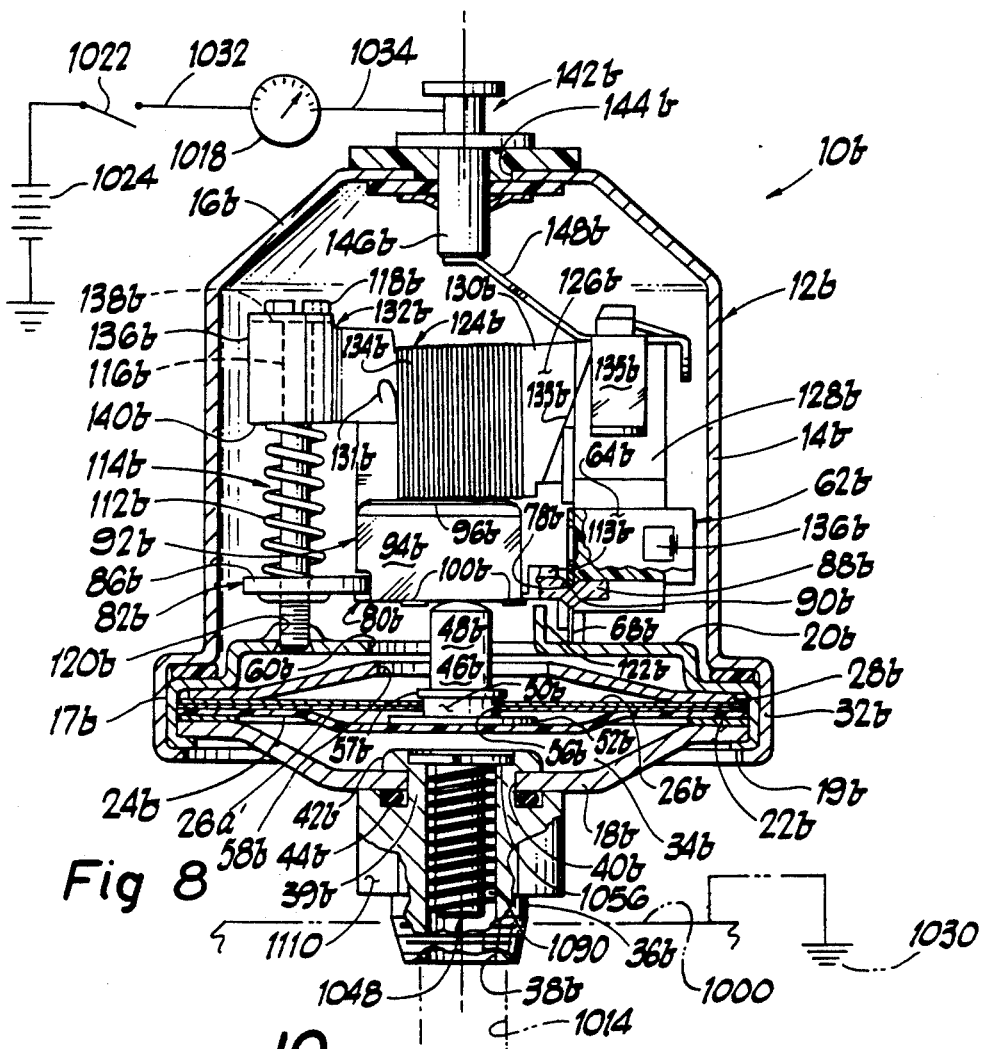
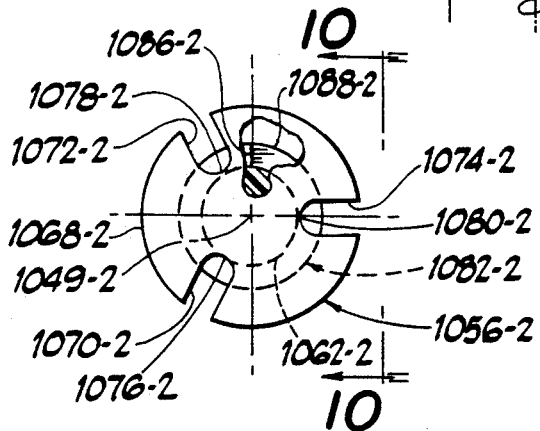
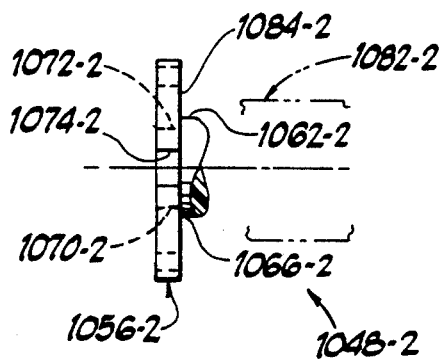

PRESSURE TRANSDUCER

RELATED APPLICATION

This application is a Continuation of my earlier filed application Ser. No. 07/635,206 filed Dec. 28, 1990, for "Pressure Transducer", now abandoned.

FIELD OF THE INVENTION

This invention relates generally to pressure transducers and more particularly to pressure transducers which must sense fluid pressures of pulsating magnitudes.

BACKGROUND OF THE INVENTION

As is generally well known in the art, pressure transducers are employed for sensing a monitored fluid pressure and in response thereto providing an electrical signal to an associated electrical or electronic circuit.

By way of example, in the automotive industry it is accepted practice to employ pressure transducers for monitoring the pressure of the engine oil of an automotive engine. Usually, in such arrangements, the pressure transducer is situated as to monitor the pressure of the pumped engine oil, as at a point upstream of the related engine oil pump, and in response to the sensed magnitude of the monitored oil pressure produce an electrical signal or output which, in turn, is applied to an electrical read-out gauge located as on the instrument panel of the associated vehicle to thereby advise the operator of such vehicle as to engine oil pressure as well as the insufficiency thereof.

A problem has developed in the use of pressure transducers, as described, in that some automotive engines, especially of the internal combustion piston type, exhibit an operating characteristic which, in the main, is incompatible with the pressure transducer producing a useful electrical signal or output to the related electrical read-out gauge.

More particularly, it has been found that, for example, a manufacture of engines may specify, as to a manufacturer of pressure transducers, that the pressure transducer to be supplied for a particular engine must operate accurately (i.e., produce accurate and reliable electrical output signals) even if the magnitude of the engine oil pressure has pulsations in the range of 4.0 p.s.i. However, when the pressure transducer, designed for such a specified range of engine oil pulsations, is operatively connected to the engine, the output of the pressure transducer is unstable and unreliable. In such situations it has been found that the actual range of engine oil pulsations is actually much greater than that originally believed and specified.

Such pressure transducers, as is well known in the art, comprise a passage or passage means which serves to communicate as between a pressure responsive and movable wall means, and the like, within the transducer, and a source of the engine oil, under pressure, being monitored. One way of overcoming the problem, of an increased or excessive range in magnitude of engine oil pulsations, would be to further constrict the cross-sectional flow area of the transducer's passage means communicating with the source of pressurized engine oil. However, to do that would make such transducer passage means much more vulnerable to becoming blocked as by foreign particles which may be carried by the engine oil thereby effectively rendering the pressure transducer inoperative. Further, it is not unusual for an engine manufacturer to specify the acceptable minimum cross-sectional flow area of such transducer passage means. The establishment of such an acceptable minimum cross-sectional flow area, in turn, often prevents the pressure transducer manufacturer from being able to sufficiently constrict the transducer passage means in order to sufficiently damp the engine oil pulsations.

Accordingly, the invention as herein disclosed is primarily directed to the solution of the aforestated as well as other related and attendant problems of the prior art.

SUMMARY OF THE INVENTION

According to one aspect of the invention an apparatus for monitoring the variable magnitude of pressure of a fluid under pressure comprises pressure responsive means responsive to the magnitude of said pressure of said fluid under pressure, and conduit means communicating generally between said pressure responsive means and said fluid under pressure, wherein said conduit means comprises at least one passage of generally helical configuration.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 8 is a generally axially cross-sectional view of a different pressure transducer which also employs teachings of the invention;

FIG. 9 is a view similar to that of FIG. 6 illustrating, in relatively reduced scale, another embodiment or modification of the element shown in FIGS. 5 and 6;

FIG. 10 is a fragmentary elevational view taken generally on the plane of line 10—10 of FIG. 9 and looking in the direction of the arrows;

DETAILED DESCRIPTION OF THE PREFERRED EMBODIMENT

Figure 1:
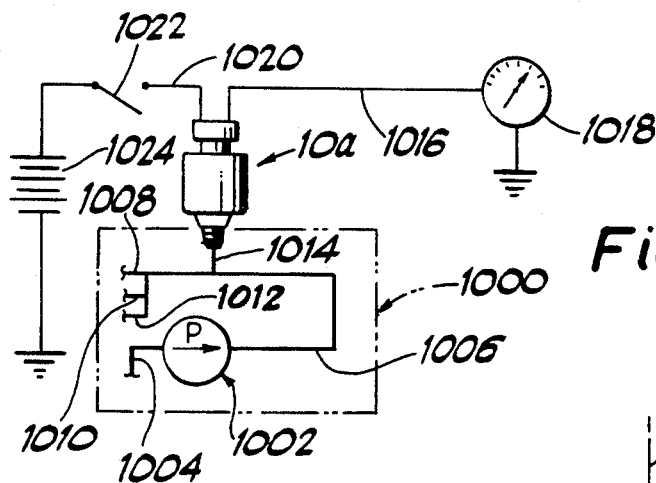
FIG. 1 is a rather simplified schematic and diagrammatic illustration of an automatic engine provided with a pressure transducer employing teachings of the invention.

Referring in greater detail to the drawings, FIG. 1, somewhat schematically, depicts an automotive engine 1000, having, as for example well known in the art, an oil pump 1002 with an inlet 1004 communicating with a source or reservoir of engine lubricating oil. Oil, under pump pressure is discharged from pump 1002 and into supply passage or conduit means 1006 leading to various locations within the engine 1000 as generally depicted by branch conduit or passage means 1008, 1010 and 1012.

A pressure transducer assembly 10a is depicted as operatively threadably engaged with the engine 1000 as to have such assembly 10a communicate, as by conduit or passage 1014, with passage means 1006. In the configuration depicted in FIG. 1, one of the electrical terminal means of transducer assembly 10a is electrically connected to conductor means 1016 leading as to an electrical gauge 1018 situated as within the interior of the associated vehicle and carried as by the instrument panel thereof. The purpose of the gauge 1018 is to indicate to the operator of the vehicle whether the engine lubricating oil pressure is of a sufficient magnitude. Another of the electrical terminal means of transducer assembly 10a is electrically connected to conductor means 1020, which may comprise switch means 1022, leading as to a source 1024 of electrical potential. The switch means 1022 may be actuated by or comprise the engine ignition switch assembly.

The pressure transducer assembly 10a of FIGS. 1 and 2, except as hereinafter noted to the contrary, is identical to the embodiment of FIG. 1 of U.S. Pat. No. 4,718,278 dated Jan. 12, 1988, which is hereby incorporated by reference. Although not considered necessary to the understanding of or the practice of the invention, if additional descriptive material should be desired, such may be obtained as from FIGS. 2–15, and related written description, of said U.S. Pat. No. 4,718,278.

Figure 2:
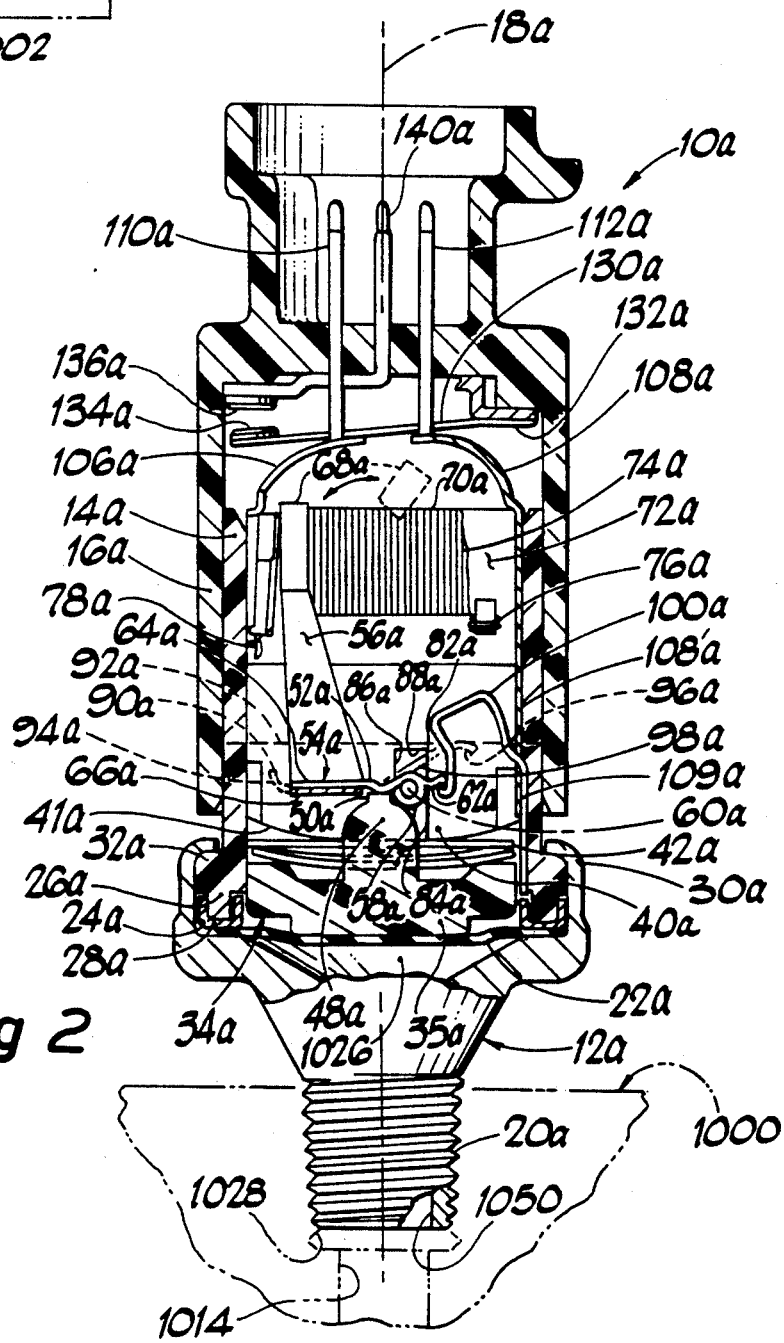
FIG. 2 is a relatively enlarged generally axially cross-sectional view, with portions thereof in elevation, of the pressure transducer of FIG. 1.

In FIG. 2 hereof, all the reference numbers provided with a suffix "a" correspond to like reference numbers, without a suffix "a" in said U.S. Pat. No. 4,718,278.

Referring in greater detail to FIG. 2, the pressure transducer 10a is depicted as comprising a metal base or end member 12a, a first cylindrical plastic body part 14a and a cooperating second cylindrical plastic body part 16a. The base or end member 12a along with the two body parts 14a and 16a serve to form the housing of the pressure transducer 10a. The parts or member 12a, 14a and 16a are depicted as being coaxial with the main longitudinal axis 18a and, preferably, each has a generally circular cylindrical configuration in transverse cross-section.

The base or end member 12a is shown provided with an axially extending externally threaded portion or nipple 20a within which is formed a pressure sensing passage or port communicating as between a pressure chamber 1026 and a source of fluid under pressure as at 1014 of FIG. 1. The pressure transducer 10a is effective to be operatively threadably engaged with a related object, in this example an automotive engine, as by a cooperating internally threaded portion 1028.

The axial end of base or end member 12a opposite to threaded nipple 20a is secured to one axial end of body part 14a and a diaphragm 22a of circular shape is disposed between them. The outer perimeter margin of diaphragm 22a is held between an internal circular shoulder 24a formed in base member 12a and a circular lip 26a projecting axially from the lower end of body part 14a. In the embodiment of the pressure transducer 10a illustrated, a circular metal ring 28a fits over lip 26a and it is the metal ring 28a which actually bears against the outer perimeter of diaphragm 22a. The forceful retention of the diaphragm's outer perimeter margin is accomplished by crimping a flange 30a at the free end of base 12a onto an external circular shoulder 32a which is formed on body part 14a slightly beyond lip 26a. With this retention, diaphragm 22a is securely held between the end member 12a and body part or section 14a to thereby form a pressure responsive movable transverse wall which separates the pressure chamber 1026 from the internal transducer movement.

The fluid pressure which is sensed or transmitted to chamber 1026 acts, through diaphragm 22a, on an actuator 34a which has a generally circular shaped head 35a. As shown at 36—36 of FIG. 2 of said U.S. Pat. No. 4,718,278, a pair of legs project from head 35a, on diametrically opposite sides thereof, and extend through cooperating guide slots 38—38, also shown in FIG. 2 of said U.S. Pat. No. 4,718,278, formed generally in internal portions 40, within body part or section 14a, as also shown in FIG. 2 of said U.S. Pat. No. 4,718,278. The purpose of such legs and cooperating guide slots is to guide the actuator 34a for substantially straight-line motion along axis 18a in response to changes in the sensed fluid pressure. The axial ends 41a, of said internal portions 40, which face toward actuator 34a are convexly contoured. A stack 42a of one or more springs is disposed between contoured ends or surfaces 41a and head or pusher 35a. The particle selection of the spring characteristics is chosen to produce the desired response characteristic of the transducer 10a. As depicted in FIG. 2, the outer periphery of head 35a bears against the spring stack 42a. Generally, the position of the various elements in FIG. 2 may be considered as that assumed in, for example, a null condition wherein the pressure within chamber 1026 is at ambient atmospheric at which time the spring stack 42a may be considered as being fully relaxed.

In response to an increasing magnitude of fluid pressure within chamber 1026, diaphragm 22a and actuator 34a will be urged upwardly, as viewed in FIG. 2, with the movement thereof being resisted by the force of the spring stack 42a as the stack 42a is progressively increasingly stressed. The extent of upward axial displacement of the actuator 34a for a given spring stack 42a is a function of the pressure applied to the pressure chamber means 1026. As the magnitude of such pressure increases, the spring stack 42a increasingly resiliently deflects with the limit of travel being attained as when the deflected spring stack 42a is fully pressed against the convex abutment surface means 41a—41a. Consequently, for a given spring stack 42a characteristic the positioning of the actuator 34a is correlated with a particular pressure range.

Head or pusher 35a also carries a central projection 48a as on the face opposite diaphragm 22a. Projection 48a is shown terminating in a small tip 50a and the spring stack 42a is configured as not to interfere with a projection 48a.

Actuator 34a acts via tip 50a on a crank mechanism 52a which comprises a pivot member 54a and a wiper member 56a. Pivot member 54a is preferably fabricated as a metal piece (and as viewed in FIG. 5 of said U.S. Pat. No. 4,718,278, may have a generally cruciform shape). Transverse portions 58a of member 54a are rolled into generally cylindrical shapes to form pivot journals which provide for pivoting of the member 54a about a pivot axis 60a. Portions 62a and 64a of the member 54a situated at generally opposite sides of the axis 60a function as crank arms.

Wiper member 56a, preferably a resilient metal piece having a base 66a joined to crank arm 64a, further comprises wiper blades 68a—68a, situated as at opposite sides of crank arm 64a, which, as viewed in FIG. 2, project upwardly to thereby have the swingable end portions thereof provide contact surfaces which bear from opposite sides, or directions, on an electric circuit resistor element 70a.

Resistor 70a may be comprised of a non-conductive core 72a and a resistor wire 74a which is wound about the outside of the core 72a and along its length. The ends of the resistor wire have respective terminations 76a and 78a enabling the resistor to selectively connect with an external circuit when the transducer assembly 10a is put in use.

A slot 82a, provided in portions 40a—40a, is open at the end surfaces 41a—41a and extends parallel to axis 18a. The slot 82a is shown as comprising an end wall 88a, generally opposite to the opening of slot 82a at end surfaces 41a, and side walls 84a and 86a which are parallel to axis 18a. The distance between the two side walls 84a and 86a is just slightly greater than the outside diameter of the pivot journals 58a of pivot member 54a thereby enabling the pivot member 54a to be assembled to the housing part 14a by registering the pivot portions 58a—58a with the open end of the slot 82a.

The extent to which the pivot portions 58a can be inserted into slot 82a is controlled by a pair of adjusters 90a. Body part 14a is further provided with a pair of parallel apertures 92a and it is within each of these two apertures 92a that a corresponding one of the adjusters 90a is disposed. Apertures 92a are transverse to axis 18a but they do not lie on a diameter. Rather they lie on parallel chords and intersect slot 82a. That is each aperture 92a extends through a corresponding internal portion 40a and in so doing intersects slot 82a. Each adjuster 90a is disposed to act upon a corresponding one of the pivot portions 58a of pivot member 54a.

The adjusters 90a are figured for forceful fits within apertures 92a and are preferably formed metal parts with each comprising a first portion 94a disposed within the corresponding aperture 92a to one side of slot 82a, and another portion 96a which is disposed to the opposite side of slot 82a. An intermediate portion 98a of the adjuster spans slot 82a at an acute angle.

Because the intermediate portion 98a of each adjuster 90a spans slot 82a at an acute angle, the axial position of each adjuster 90a within the corresponding aperture 92a controls how far the corresponding pivot portion 58a can be inserted into slot 82a. For example, if the adjuster 90a illustrated in FIG. 2 were to be moved within its aperture 92a toward the left, this would permit the pivot 58a to be inserted further into slot 82a toward wall 88a. If it were moved to the right, the extent to which the pivot could be inserted would be less.

In the assembled transducer, actuator 34a acts on pivot member 54a. A spring member 100a is also preferably associated with the transducer movement so as to bias the pivot member 54a in a sense which will resist motion imparted to actuator 34a in response to increasing sensed pressure. The spring member 100a may have a general U-shape with one end thereof being suitably secured with respect to the transducer housing and the opposite end being hooked so as to provide a connection with the distal end of arm portion 64a. As viewed in FIG. 2, spring member 100a is effective to urge the pivot member 54a in the counterclockwise sense about axis 60a. The strength of the force of spring 100a is just sufficient to maintain pivot member 54a in contact with tip 50a of actuator 34a so that the crank mechanism follows the positioning of the actuator member 34a in response to sensed pressure changes and has no major interaction with stack 42a.

In view of the foregoing, it is believed evident that the action of the actuator 34a on the crank mechanism 52a will serve to increasingly pivot the crank mechanism 52a about axis 60a in response to increases in sensed pressure. Accordingly, the wiper blades 68a will move along an arcuate path of travel which is concentric with axis 60a. It is this arcuate motion which takes place in the contact of the wiper blades 68a with the resistor 70a, 74a. FIG. 2 shows a broken line position for the wiper blades at maximum sensed pressure. The size of the distal end portions of wiper blades 68a is sufficiently large that contact is maintained between the wiper blades and the opposite sides of the resistor throughout the arcuate range of travel of the crank mechanism 52a.

Transducer 10a may comprise contacts 106a and 108a which may be formed conductive elements disposed diametrically opposite each other. Termination 78a is joined to contact 106a.

The two contacts in turn make connection with respective terminals 110a and 112a mounted in a particular geometrical configuration on one end of body part 16a.

Wiper member 56a forms a means to pick a selectable proportion of the resistor. It is arranged to have an interaction with an external electric circuit whereby the selectable proportion of the resistor provides the electrical signal input to the circuit. By connecting the wiper with contact 108a the selectable proportion of the resistance presented across terminals 110a and 112a to an external circuit connected thereto comprises that portion of resistor 70a between termination 78a and the point of contact of the wiper with the resistor.

In the embodiment of FIG. 2, the circuit path comprises wiper member 56a, pivot member 54a and spring member 100a to a conductive extension 108'a of contact 108a on which one end of spring member 100a is mounted as at 109a.

With the wiper in the solid line position shown in FIG. 1, relatively low electrical resistance is presented to the associated external electrical circuit via terminals 110a and 112a. As the wiper mechanism is operated in the clockwise direction, as viewed in FIG. 2, the amount of electrical resistance which is presented across terminal 110a and 112a increases.

In view of the foregoing it should now be apparent that the fluid pressure within conduit or passage means 1006 and 1014 is communicated or transmitted through passage means, formed in lower housing 12a, to the presence chamber 1026 where it then acts upon the pressure responsive movable wall means or diaphragm means 22a to thereby position the actuator or piston-like member 34a axially along axis 18a to a position correlated to the magnitude of the monitored fluid pressure. This, of course, also causes the simultaneous positioning of lever-like member 54a and wiper blades 68a as already described.

Figure 3:
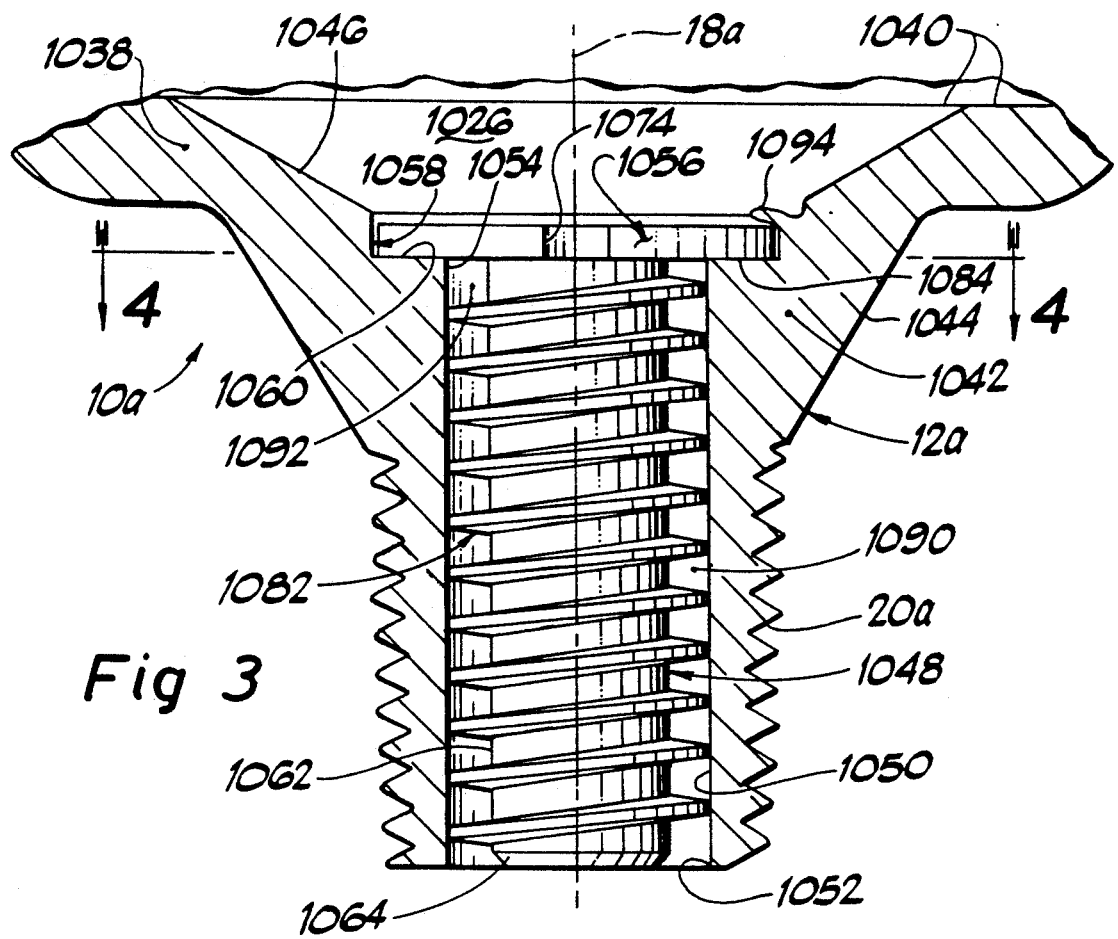
FIG. 3 is a further relatively enlarged portion of the pressure transducer of FIGS. 1 and 2 shown in axial cross-section.

FIG. 3 illustrates in relatively enlarged scale, and in axial cross-section, a fragmentary but major portion of the end member 12a shown in FIG. 2. In FIG. 3, the diaphragm or pressure responsive movable wall 22a is not shown.

Referring in greater detail to FIG. 3, the end member 12a is illustrated as comprising a generally lateral or transverse annular body portion 1038 which, at its outer periphery has an integrally formed generally upstanding wall portion as depicted at 30a of FIG. 2. Body portion 1038 is preferably formed with a generally radiating annular surface 1040 which may be employed for receiving thereagainst a generally radially outer or peripheral portion of diaphragm 22a as depicted in FIG. 2. Preferably formed integrally with body portion 1038 is a depending axially extending body portion 1042 which, as at its generally upper area, may be formed to have a generally conical outer surface portion 1044 and which, at its generally lower area, may be formed with the external threads 20a intended for threadable connection as with internal threaded portion 1028 as depicted in FIG. 2 (the assembly 10a being threadably rotatable as by suitable tool-engaging surface means, as is well known in the art, formed as on the external peripheral surface of body portion 1038). Further, in the preferred embodiment, the end member 12a is provided with a conical surface portion 1046 which, when assembled as depicted in FIG. 2, comprises a portion of the pressure chamber 1026. An insert 1048, hereinafter described in detail, is situated in a passage 1050 formed in end member 12a.

Figure 4:
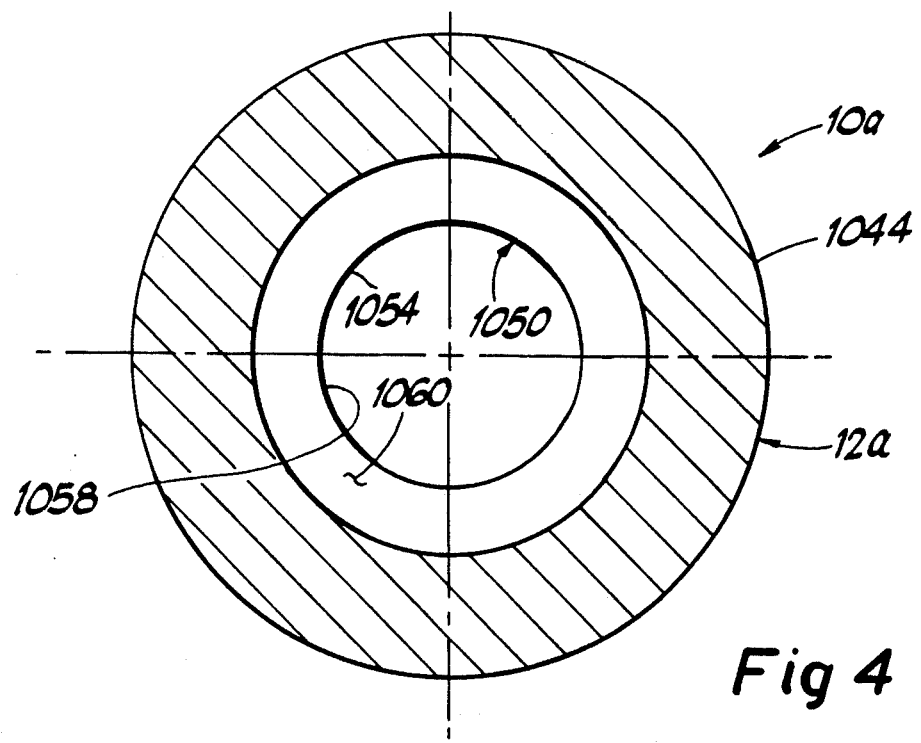
FIG. 4 is a cross-sectional view taken generally on the plane of line 4—4 of FIG. 3 and looking in the direction of the arrows.

As shown in both FIGS. 3 and 4 (FIG. 4 being a cross-sectional view taken on the plane of line 4—4 of FIG. 3, but not including the insert means 1048 of FIG. 3), the passage 1050 is preferably formed of circular cylindrical configuration and to extend axially through end member 12a, as along axis 18a, and having an open lower (as viewed in FIG. 3) end 1052 and an open upper end 1054 communicating with the chamber 1026. In the embodiment depicted, the insert means 1048 is provided as with head or flange portion 1056 which is preferably positioned or seated in a counterbore 1058 having an annular abutment surface 1060.

Figures 5, 6:
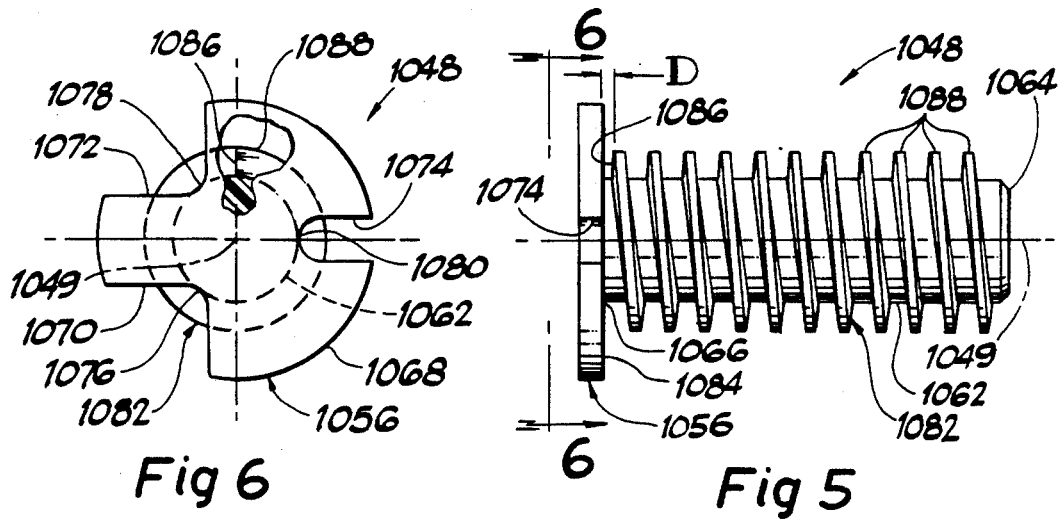
FIG. 5 is an elevational view of one of the elements shown in FIG. 3.
FIG. 6 is a view taken generally on the plane of line 6—6 of FIG. 5 and looking in the direction of the arrows.

Referring in greater detail to FIGS. 5 and 6, the insert means 1048 of FIG. 3 is illustrated as comprising a circular cylindrical axially extending main body or core portion 1062 having first and second axial ends, 1064 and 1066, with the flange or head portion 1056 being, preferably, formed integrally with core 1062 at end 1066 thereof. In the embodiment disclosed, and as best shown in FIG. 6, the head or abutment portion 1056 is formed preferably to be a body portion having a circular cylindrical outer surface 1068 which is interrupted as by a plurality of relieved or slot-like portions 1070, 1072 and 1074. Further, in the preferred embodiment of the insert means 1048, the slot-like portions 1070, 1072 and 1074 are formed as to have respective radially innermost portions, 1076, 1078 and 1080, situated radially inwardly a distance sufficient to at least be tangent to the outer surface of core or body portion 1062.

Still referring mainly to FIGS. 5 and 6, the insert means 1048 is illustrated as comprising a continuous thread-like or ridge-like portion 1082 progressing axially and helically along the core or body portion 1062 and preferably integrally formed therewith. In the embodiment illustrated, only a single continuous thread-like portion 1082 is employed (only a part thereof being also shown in hidden line); however, in practicing the invention multiple continuous thread-like portions could be employed. Further, in the preferred embodiment of the insert means 1048, the thread-like or ridge-like portion 1082 is formed as to not continue to or against the under-surface or abutment surface 1084 of head portion 1056. The thread-like portion 1082, at its left-most end as viewed in FIG. 5, is depicted as ending as at 1086 which is shown as being at a selected distance, D, away from surface 1084. In FIG. 6, a portion of the head or abutment 1056 as well as a portion of the body or core 1062 are broken away (with a part of the body or core 1062 being in cross-section) in order to better illustrate the end 1086 of the ridge-like portion 1082.

In the preferred embodiment, of the form of the insert means 1048, the radially outer surface 1088 of the ridge-like portion is formed as to lie in the trace of a right circular cylinder with at least a major portion of such outer surface 1088, as measured generally axially, being flat as viewed in either FIGS. 5 or 3, i.e., substantially parallel to the axis 1049 of insert means 1048.

Referring to each of FIGS. 3, 4, 5 and 6 it can be seen that when the insert means 1048 and end member 12a are assembled, a continuous generally helical passage of conduit means 1090 is cooperatively formed by the ridge-like or thread-like portion 1082 and the inner cylindrical surface or passage 1050. The resulting conduit or passage means 1090 has a cross-sectional flow area (as viewed in FIG. 3) much smaller than the cross-sectional flow area of passage 1050 (as viewed in FIG. 4). Additionally, the effective distance of flow through conduit or passage means 1090, as measured helically from the lower-most end (as viewed in FIG. 3) of thread-like portion 1082 to above the upper-most end of thread-like portion 1082, is much greater than the overall axial length of such thread-like portion 1082. In the embodiment of FIGS. 3, 4, 5 and 6, such effective distance of flow through conduit means 1090 is also much greater than the axial length of passage 1050.

Further, as should be evident in view of FIGS. 3, 5 and 6, because of the thread-like portion 1082 terminating as at 1086 (FIGS. 5 and 6) so as not to contact, or be formed integrally with, the surface 1084 the area or volume of the space generally above (as viewed in FIG. 3) the last full helical coil or ridge-like or thread means 1082 and below the head or abutment portion 1056 is a generally annular or ring-like space 1092 which is in communication with the pressure chamber 1026 (FIGS. 2 and 3) via relieved or recess-like areas 1070, 1072 and 1074 (FIG. 6).

In the embodiment of FIGS. 2, 3, 5 and 6 the head portion 1056 is employed as an abutment means having its surface 1084 abut against surface 1060 of counterbore 1058. To positively assure that the insert means 1048 will remain in its depicted (FIG. 3) assembled condition, a portion of end member 12a may be peened or crimped over the head 1056 as generally illustrated at 1094. Of course, other means securing insert means 1048 as against relative axial movement are possible.

Although the insert means 1048 of FIGS. 3, 5 and 6 may be formed in any suitable manner and with any suitable material, in the preferred embodiment thereof the insert means 1048 is comprised of plastic material with such being preferably molded. Further, among the available suitable plastic materials, it is preferred that a polyamide be employed and, more particularly, that such be a nylon and still further that the actual material be comprised of a 60% glass filled nylon (commercially available).

The insert means 1048 may be made, for example, as by machining a stock to the configuration disclosed or cold rolling the thread-like portion 1082 and either machining the head portion 1056 or suitably securably attaching a separately formed head or abutment portion 1056 to formed core or body 1062. As should be apparent, a suitable metal, such as steel, may be used for forming the insert means 1048 in both of such methods.

In one embodiment of the invention; the diameter of the core or body 1062 was in the order of 0.170 inch, the outer diameter of the thread-like portion 1082 was in the order of 0.250 inch, and the diameter of passage 1052 (FIG. 3) was in the order 0.250 inch. Such can be seen to provide two extreme dimensional conditions; that is, depending upon manufacturing tolerances, there could be outer surface 1088 of thread-like portion 1082 and inner surface of passage 1052. Generally, it is preferred that at least a light press-fit exist therebetween. Further, in such one embodiment the thread-like means 1082 was formed to be 20-pitch with the resulting cross-sectional flow area of the helical passage or conduit means being in the order of 0.0014 sq. inch which is (in the assumed given conditions or requirements) greater than the permitted smallest flow area defined by a diameter of 0.040 inch (which is equal to 0.0013 sq. inch). Still further, in such one embodiment, the axial distance traversed by the helical thread means 1082 was in the order of 0.545 inch while dimension, D, (FIG. 5) was in the order of 0.020 inch.

OPERATION

The operation of the transducer means 10a employing the insert means 1048 as within its end member 12a, will be explained with reference being made to the graphs of FIG. 7 and assuming certain conditions for purposes of discussion. First, let it be assumed that the prior art transducer means 10, 200, 300, 400, 500 or 600 as shown in U.S. Pat. No. 4,718,278 has a fluid pressure communicating passage or conduit as shown (un-numbered) in the lower end member of said transducer means 600 in FIG. 13 of said U.S. Pat. No. 4,718,278 and that the diameter of such fluid pressure communicating conduit is in the order of 0.04 inch. Although not shown in said FIG. 13, it is often accepted practice to provide, instead of a straight uniform fluid pressure communicating passage or conduit, as depicted in said FIG. 13, a generally stepped fluid pressure communicating conduit having, as at its entrance end, an axially relatively short calibrated passage (for example the assumed 0.04 inch diameter) which, in turn, communicates with a continuing passage of much greater diameter and relatively much greater axial length. Let it also be assumed that the pressure transducer means is intended to be employed in combination with an automotive engine for sensing and responding to the pressure of the engine lubricating oil and, further, that the manufacturer of such engine has specified that: (a) the cross-sectional flow area of the fluid pressure communicating passage or conduit (or any part of it) may not be smaller than that equal to an area 0.04 inch diameter; and (b) that such transducer means, in producing its output, not be unstable with respect to peak-to-peak engine oil pressure perturbations and frequencies as depicted by graph 1100 of FIG. 7 hereof which has a pressure range identified as, Range No. 1. The graph 1100 represents the cyclic changes in the engine oil pressure for a selected engine speed. For purposes of discussion, it may be assumed that each of cyclic higher pressures on graph 1100 are in the order of 42.0 p.s.i. while each of cyclic lower pressures on graph 1100 are in the order of 38.0 p.s.i. Pressure transducers of the prior art, as hereinbefore described especially with reference to the fluid pressure communicating conduit (and the stepped versions thereof) of FIG. 13 of said U.S. Pat. No. 4,718,278, could successfully damp the sensed peak-to-peak pressure variations or perturbations as depicted by graph 1100 and still not have a calibrated fluid pressure communicating conduit of a cross-sectional flow area smaller than the assumed minimum limitation of 0.04 inch diameter. Let it now be further assumed that such prior art engine oil pressure but instead of the engine having peak-to-peak oil pressure variations or perturbations as depicted by graph 1100, the engine actually exhibits peak-to-peak cyclic oil pressure variations or perturbations as depicted by graph 1102 which has a pressure range identified as, Range No. 2. For purposes of discussion it may be assumed that the greatest cyclic peak oil pressure, as typically represented by points 1104, is in the order of 68.0 p.s.i., while the comparatively lower cycle peak oil pressure, as typically represented by points 1106, is in the order of 51.0 p.s.i. In comparing graphs 1100 and 1102, it is evident that the second condition represented by graph 1102 has peak-to-peak cyclic oil pressure perturbations in the order of 17.0 p.s.i. and a frequency in the order of 65.0 hertz while the first condition (assumed to have been given as a design parameter for the transducer means) represented by graph 1100 has peak-to-peak cyclic oil pressure perturbations in the order of 4.0 p.s.i. and a frequency in the order of 30.0 hertz.

Figure 13:
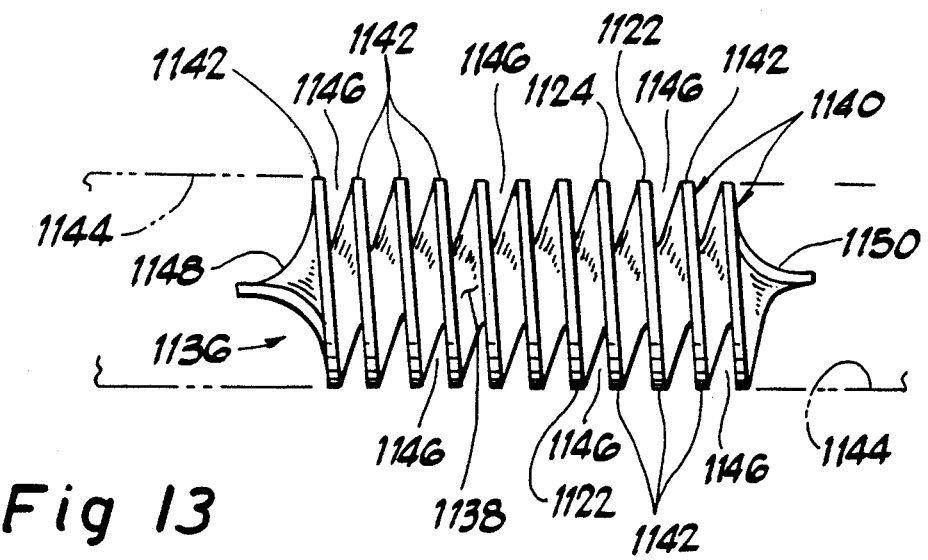
FIG. 13 is a view similar to that of FIG. 11 illustrating the embodiment of the invention made as from the plate-like member of FIG. 12.

In has been discovered that even though pressure transducers of the prior art, hereinbefore described especially with reference to the fluid pressure communicating conduit (and the stepped versions thereof) of FIG. 13 of said U.S. Pat. No. 4,718,278, could successfully damp the sensed peak-to-peak oil pressure variations or perturbations of the condition represented by graph 1100 and not experience an unstable transducer output of control, such prior art transducers exposed to oil pressure variations or perturbations of the condition represented by graph 1102 could not successfully damp the cyclic pressure variations and could not produce, in response thereto, a reliable transducer output or control function.

As is generally known in the art, increased damping capability, as in a pressure transducer assembly, can be achieved by further reducing the cross-sectional flow area of the fluid pressure communicating conduit (as previously discussed and identified). However, under the hereinbefore assumed given limitations, such prior art transducer already had the cross-sectional flow area of its fluid pressure communicating conduit at the specified minimum flow area, equal to a conduit of 0.04 inch diameter, and therefore such prior art transducer could not be changed (to successfully damp the perturbations of graph 1102) by further reduction of the cross-sectional flow area of its fluid pressure communicating conduit.

As is also generally known in the art, increased damping capability, as in a pressure transducer assembly, can be achieved by lengthening the fluid pressure communicating conduit. However, doing so, in this situation, is not a viable solution because, as a practical matter, it is extremely difficult to successfully drill a relatively long fluid pressure communicating conduit where the diameter of such drilled conduit is 0.04 inch diameter (slightly greater than 1/32 inch). The difficulty arises at least in any or all of the following manufacturing considerations: (a) the need of high volume production which, in turn, requires the drill bit to undergo a fast feed which is effectively incompatible with the small diameter of the drill bit; (b) high localized heat generation of the drill bit point because of the small diameter and fast feed of the drill bit thereby faster dulling and weakening the drill bit and requiring increased machine tool shutdown for changing of the drill bits; and (c) the usual tendency, especially of a small diameter drill bit employed to drill relatively long holes, to significantly wander from a straight line thereby often resulting in the drill bit binding in the work-piece and breaking.

Even assuming that the foregoing manufacturing considerations were not of a magnitude which (as a practical matter) precluded the lengthening of the fluid pressure communicating conduit by such additional drilling as discussed, it was discovered that the fluid pressure communicating conduit, of such prior art pressure transducer, in order to be effective in damping the oil pressure perturbations of the condition depicted by graph 1102, would have to be of a length significantly greater than the distance available in the transducer housing or end member. In some situations the required length of the pressure communicating conduit could be such as to, in turn, require the end member (such as 12 of FIG. 1 of said U.S. Pat. No. 4,718,278 and other end members shown therein) to become of such an increased axial length as not to permit the overall pressure transducer assembly to be receivable within the space therefor as defined and provided by, for example, the engine manufacturer.

Figure 7:
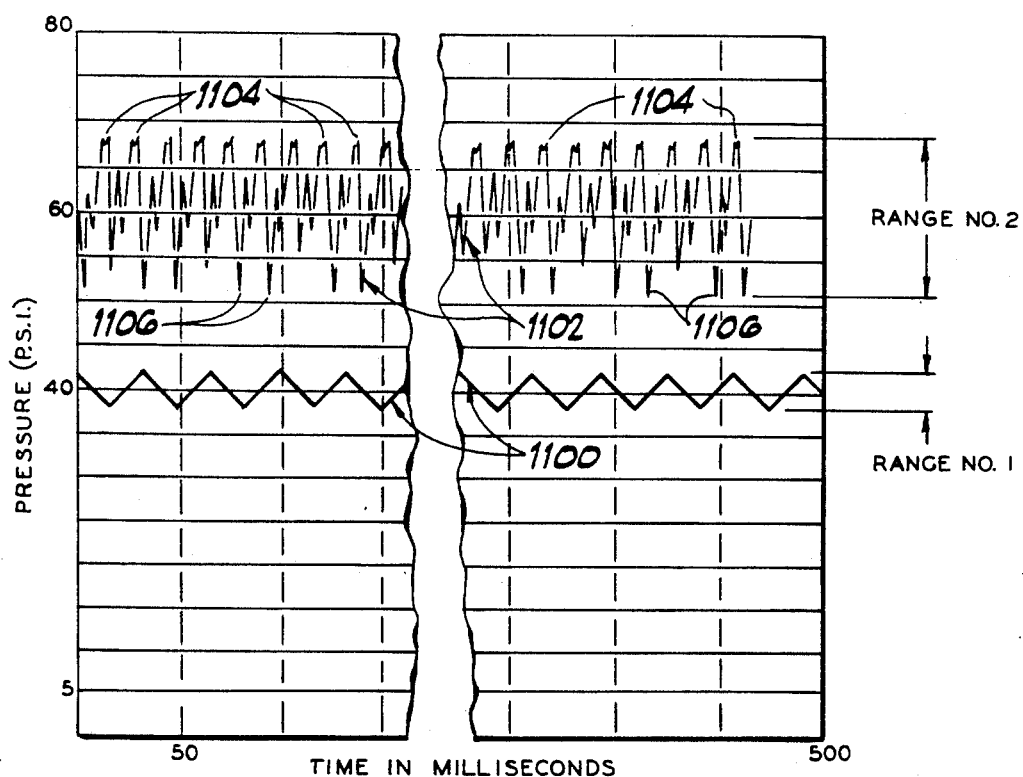
FIG. 7 is a graph, with a fragment thereof broken away, depicting in a typical manner problems which the invention overcomes.

In contrast, the invention enables the use of the even prior art pressure transducer end members, modified in accordance with the teachings of the invention, to meet all such requirements of and relating to damping of sensed fluid or oil pressure perturbations as represented by graph 1102 of FIG. 7 hereof.

More particularly, referring to FIGS. 2, 3, 5 and 6, when the insert means 1048, of FIGS 5 and 6, is assembled to and in the end member or housing portion 12a, as generally depicted in FIG. 3, and the assembled housing portion 12a and insert 1048 are then assembled into the overall pressure transducer assembly 10a of FIG. 2, the result is that: (a) fluid and pressure communicating conduit or passage means 1090 is formed as by the cooperative surfaces of core or body 1062, axially spaced and opposed surfaces of the thread-like or ridge-like portion 1082 and the inner surface of conduit or passage 1050; (b) the cross-sectional flow area of passage means 1090 is at least equal to the minimum cross-sectional flow area as may be specified by, for example, the engine manufacturer; and (c) the actual helical or spiral length of the fluid and pressure communicating conduit or passage means 1090 is relatively long and of a length sufficient to achieve the damping required, in a condition depicted by graph 1102 of FIG. 7 thereby providing the attendant required output or control of transducer means 10a.

FIG. 2 depicts the transducer assembly 10a (which comprises end member or housing 12a and insert means 1048) operatively connected as to an automotive engine 1000 as to have the inlet 1052 (FIG. 3) of passage 1050 in communication with engine oil as via conduit means 1014. When the engine 1000 is operating, the oil pump 1002 pressurizes the oil as within conduit or passage means 1006, 1008, 1010, 1012 and 1014 and such pressurized oil flows into inlet 1052 and through passage means or conduit means 1090 into the annulus or ring-like chamber 1092 from where the pressurized oil flows through the spaces or recesses 1070, 1072 and 1074 (also FIGS. 3, 5 and 6) and into pressure chamber 1026 where it acts against pressure responsive movable wall means or diaphragm means 22a. The diaphragm means 22a and related elements will move upwardly (as viewed in FIG. 2) depending upon and in response to the magnitude of the pressure of such monitored pressurized oil.

Embodiment of FIG. 8

FIG. 8 depicts a different form of pressure transducer which also comprises teaching of the invention. The pressure transducer 10b of FIG. 8, except as hereinafter noted to the contrary, is identical to the embodiment of FIG. 1 of U.S. Pat. No. 4,079,351 dated Mar. 14, 1978, which is hereby incorporated by reference. Although not considered necessary to the understanding of or the practice of the invention, if additional descriptive material should be desired, such may be obtained as from FIGS. 2–6, and related written description, of said U.S. Pat. No. 4,079,351.

In FIG. 8 hereof, all the reference numbers provided with a suffix "b" corresponds to like reference numbers, without a suffix "b" in said U.S. Pat. No. 4,079,351.

Referring in greater detail to FIG. 8, the pressure transducer 10b is depicted as comprising a housing 12b including a generally cylindrical center wall 14b and an inwardly tapering upper wall 16b which is disposed over the sender pressure chamber 17b upon which the components of the assembly 10b are mounted. The pressure chamber assembly generally includes, among other elements hereinafter described, an outer mounting wall 20b, an inner partition 28b, a pair of contiguous annular-like spring members 26a' and 26b' (respectively having reference numbers 26a and 26b in said U.S. Pat. No. 4,079,351), a diaphragm 24b, a bottom wall 18b, and a gasket 22b sealingly engaged between the peripheral edges of bottom wall 18b and diaphragm 24b. The peripheral edge portion of mounting wall 20b is crimped as at 19b over the corresponding edges of spring members 26a' and 26b', diaphragm 24b and bottom wall 18b to secure these elements in the configuration shown. A circumferentially extending lip 32b is formed at the lower end of central wall 14b of housing 12b, which lip is itself crimped over the crimped peripheral edge 19b of mounting wall 20b securing the housing to the pressure chamber assembly.

Bottom wall 18b and diaphragm 24b, which may be formed of any elastomeric material suitable for its environment, define a fluid-tight chamber 34b. The interior of chamber 34b is adapted to fluidly communicate with the monitored fluid, which may be a conduit or passage 1014 as shown in FIGS. 1 and 2, as by a threaded fitting 36b having an axially extending bore or passage 38b formed therethrough and opening into chamber 34b. A reduced diameter upper end 39b of fitting 36b passes through an opening 40b formed in bottom wall 18b and is secured in fluid-tight relationship thereto by crimping a collar 42b over the interior surface of bottom wall 18b so that an O-ring 44b seals the connection.

A push member 46b is disposed within pressure chamber assembly 17b and is defined by an upper rod portion 48b, a central enlarged diameter portion 50b and a lower, planar shoulder 52b whose bottom surface rests on the central area of diaphragm 24b. The rod portion 48b extends through openings 58b and 60b formed in inner partition 28b and mounting wall 20b, respectively, while the enlarged diameter portion 50b of push member 46b extends through a central opening 56b formed in springs 26a' and 26b'.

As shown in FIG. 8 (and further shown in FIGS. 2, 3 and 4 of said U.S. Pat. No. 4,079,351), a pair of substantially identical, relatively flat cantilever springs 26a' and 26b' extend over diaphragms 24b in opposed relationship thereto, their peripheral edges being held by the crimping action of edge 19b of mounting wall 20b as previously described. Each spring 26a' and 26b' is preferably formed of spring steel blanked from sheet metal to define a plurality of radially extending cantilever elements (shown at 54 of FIG. 4 of said U.S. Pat. No. 4,079,351) and the central opening 56b through which the enlarged diameter portion 50b of push member 46b passes.

FIG. 8 is intended to depict the pressure sender or transducer 10b in operative communication with a conduit or the like by which the fluid under pressure is monitored and, in FIG. 8, this pressure is assumed to have a magnitude equal to the desired, predetermined cut-off pressure; it should be noted that at such assumed condition, the upper surface of shoulder 52b of push member 46b is spaced from and does not engage the lower spring 26a'. It should be understood that at zero sensed pressure, the diaphragm 24b is in a position somewhat below that shown in FIG. 8, shoulder 52b being spaced an even greater distance from lower spring 26a'. A lip 57b is provided at the upper end or enlarged diameter portion 50b of push member 46b to provide a limit stop for the downward movement of push member 46b.

Inner partition 28b essentially provides a protective function for spring members 26a' and 26b' and has an enlarged central opening 58b through which the body portion 48b of push member 46b extends as previously mentioned.

The mounting wall 20b in effect provides the top wall of the pressure chamber assembly 17b and has a central opening 60b formed therein, again for the purpose of permitting passage therethrough of the body portion 48b of push member 46b. The remaining elements of the pressure sender or transducer 10b are mounted on wall 20b as hereinafter described.

A mounting clip 62b formed of an electrically conductive material is secured to mounting wall 20b adjacent central opening 60b. Mounting clip 62b includes a pair of resilient, opposed side portions 64b outwardly extending towards the periphery of wall 20b which are formed by bending a body portion (shown at 66 of FIG. 6 of said U.S. Pat. No. 4,079,351) of clip 62b along fold lines (shown at 65 of FIG. 6 of said U.S. Pat. No. 4,079,351 wherein it is also shown the body portion 66 having a pair of ears formed at its lower end and a corresponding pair of outwardly extending tabs 70 which engage the lower surface of mounting wall 20, extending through slots 72 formed therein. FIGS. 3 and 6 of said U.S. Pat. No. 4,079,351, also show a pair of U-shaped tabs 74 struck from mounting wall 20 and extending over the upper edges of ears 68 to retain mounting clip in place. A cut-out 76 is provided in body portion 66 having side edges partially defining ears 68 and an upper knife edge 78.).

Pivotally mounted about the knife edge 78b, in a manner hereinafter described, is a contact assembly generally designated at 80b. Contact assembly 80b is depicted as comprising an elongate, electrically conductive contact member support platform 82b defined as by a central portion (shown at 84 of FIG. 5 of said U.S. Pat. No. 4,079,351), an enlarged seating portion 86b and a pivot portion 88b having a V-shaped groove 90b formed therein. An elongate, electrically conductive contact member 92b, having a U-shaped cross-section, is secured over the central portion (84 of FIG. 5 of said U.S. Pat. No. 4,079,351) of support platform 82b. Contact member 92b includes a pair of oppositely positioned contact legs 94b having inwardly crimped contact portions 96b at their upper ends for electrically engaging a resistance element as hereinafter described. An integral bridging portion (98 of FIG. 5 of U.S. Pat. No. 4,079,351) connects contact legs 94b at their lower ends. A pair of protuberances 100b formed on the lower surface of platform central portion (84 of FIG. 5 of U.S. Pat. No. 4,079,351) extend through respective openings in said integral bridging portion to thereby accurately position the contact member 92b on platform 82b and to prevent axial shifting thereof. A pair of upwardly directed tabs 113b may be provided on contact member 92b to further aid in positioning the contact member 92b and securing it to support platform 82b. The contact member 92b is electrically grounded through the support platform 82b, clip 62b, outer mounting wall 20b, lower wall 18b, fitting 36b and apparatus or engine 1000 to ground 1030.

As previously disclosed, the contact assembly 80b is pivotally mounted about an axis defined by knife edge 78b is clip 62b. The enlarged seating portion 86b of support platform 82b is urged in a downward direction by engagement with the lower end of a helical spring 112b, which is mounted on the shank 116b of a screw 114b having a slotted head 118b, with the lower end of shank 116b passing through an opening formed in platform seating portion 86b and threadably engaging and opening 120b formed in mounting wall 20b. The upper end of spring 112b engages a busing portion 132b of a resistor assembly 124b which is normally fixed during the operation of the pressure sender or transducer 10b. By virtue of the downwardly directed force applied by spring 112b to platform seating portion 86b, the bridging portion (98 of FIG. 5 of U.S. Pat. No. 4,079,351) of contact member 92b is urged downwardly against the upper edge or end of body portion 48b of push member 46b thereby urging the pivot portion 88b of platform 82b against knife edge 78b so that groove 90b receives the knife edge. When the sender or transducer 10b is not functionally connected to a source of monitored fluid, push member 46b is urged downwardly until the limit stop 57b engages the upper surface of spring 26b'. An upwardly extending lip 122b may be formed in mounting wall 20b directly underneath platform 82b to provide a safety limit stop to prevent inadvertent downward movement of the contact assembly, which might occur, for example, during assembly, which might cause permanent deformation of springs 26a' and 26b'. Therefore, it can be seen that any upward movement of push member 46b due to an increased pressure acting on diaphragm 24b causes the contact assembly 80b to pivot about knife edge 78b against the force of helical spring 112b.

A variable resistor assembly 124b is pivotally mounted about an axis of rotation which substantially coincides with knife edge 78b provided on mounting clip 62b and about which contact assembly 80b pivots. Resistor assembly 124b includes a generally L-shaped body member 126b, preferably formed of a phenolic material, defined by a post portion 128b, a resistor portion 130b integrally formed with and extending at right angles to the upper end of post portion 128b and a bushing portion 132b which integrally extends from the free end of resistor portion 130b. A coil 134b is wound around resistor portion 130b formed of resistance wire having one end 131b electrically insulated by securing the same to the resistor portion mechanically or by lacquer and the other end 133b being connected to a contact 135b having an upwardly extending contact finger 148b. Coil 134 is located directly above the space defined between contact legs 94b.

The post portion 128b of the body member 126b is captured at its lower end between the side portions 64b of mounting clip 62b, the sides of post portion 128b being undercut so as to snap into position between the clip side portions and be retained therein by inwardly extending tabs 136b.

Bushing portion 132b is defined by a pair of opposed walls 136b (only one of which is shown) defining a passage between them through which the upper portion of screw shank 116b extends. The head 118b of screw 114b bears against a shoulder 138b formed on the inner surfaces of sleeve walls 136b. The upper end of helical spring 112b bears against a similarly formed shoulder 140b formed at the lower end of bushing walls 136b.

It should now be apparent that the variable resistor assembly 124b is mounted solely on mounting clip 62b. The variable resistor assembly by virtue of the above-described configuration of clip 62b, including cut-out (76 of FIG. 6 of said U.S. Pat. No. 4,079,351), will pivot or flex about an axis substantially colinear with knife edge 78b when a force is applied thereto in the absence of a restraining force. Therefore, if screw 114b is rotated so as to travel into or towards mounting wall 20b, the resistor assembly will pivot in a counter-clockwise manner, as viewed in FIG. 8, about a line coincident with knife edge 78b due to the engagement of screw head 118b with shoulder 138b while if the screw 114b is rotated in the opposite direction, the resistor assembly will pivot clockwise under the action of spring 112b. During operation of the sender, screw 114b is fixed and, therefore, any movement of resistor assembly 124b is prevented. Elements in FIG. 8 which are like or similar to those of either FIGS. 1 or 2 are identified with like reference numbers.

An electrical terminal post 142b extends through a suitably insulated opening 144b centrally formed in inwardly tapering wall 16b of housing 12b. The lower end 146b of terminal post 142b electrically engages the free end of contact finger 148b which is electrically connected to coil 134b as mentioned hereinabove.

In operation of the device, the pressure sender is inserted into the pressure line 1014 by threadably engaging fitting 36b into a mating fitting as may be provided in the pressure line. The fluid-tight chamber 34b is thus exposed to the pressure to be sensed and, assuming that it is above ambient, the pressure moves diaphragm 24b upwardly as shown in FIG. 8. Push member 46b is moved upwardly with diaphragm 24b so that the upper surface of rod portion 48b urges U-shaped contact member 92b into pivotal movement in a clockwise direction about knife edge 78b against the force of helical spring 112b. The pivotal movement of the contact member 92b causes the same to electrically engage coil 134b. The pivotal movement of the contact member will cause this engagement with the coil to be progressive, i.e., the contact will initially engage the coil at its left end (FIG. 8) and, as further rotation is undergone, the engagement will increase towards the right direction. The extent of engagement is determined by the extent of movement of push member 46b which in turn is governed by the extent of movement of diaphragm 24b. The extent of engagement of contact member 92b with coil 134b determines the resistance offered by sender or transducer 10b in the gauge circuit. More particularly, the circuit may include, in series, the gauge 1018, a voltage source 1024, conductor means 1032 and 1034, terminal 142b, contact 135b, coil 134b, and grounded contact member 92b. As is evident, the greater the extent of engagement of contact 92b and coil 134b, i.e., the closer to the right hand end of coil 134b is the point with which contact 92b comes into engagement, the smaller the resistance offered by the effective length of coil 134b.

In the embodiment of FIG. 8, the insert means 1048 (disclosed in FIGS. 3, 5 and 6) is contained within a passage or conduit 38b of fitting means 36b which is an element separate from the end wall or housing member 18b of the pressure transducer 10b.

As shown in FIG. 8, the upper or inner end of fitting means 36b is preferably provided with a counterbore functionally equivalent to counterbore 1058 (FIG. 3) as to receive the head, flange or abutment 1056 of insert means 1048. Also, in the preferred form of the embodiment of FIG. 8, the respective diameters of the conduit or passage 38b and of the outer surface 1088 of the helical or spiral thread-like or ridge-like means 1082 is such as to result in at least a slight interference fit therebetween. Further, if desired, the insert means 1048 may be suitably locked in the fitting means 36b as by a peened-over or crimped portion illustrated in FIG. 3.

Similarly to that previously described with reference to FIG. 2, when the insert means 1048, of FIGS. 5 and 6, is assembled to the separate end fitting means 36b and all of such are assembled to form the transducer means 10b, the result is that: (a) fluid and pressure communicating conduit or passage means 1090 is formed as by the cooperative surfaces of core or body 1062, axially spaced and opposed surfaces of the thread-like or ridge-like portion 1082 and the inner surface of conduit or passage 38b of the separate end fitting means 36b; (b) the cross-sectional flow area of passage means 1090 is at least equal to the minimum cross-sectional flow area as may be specified by, for example, the engine manufacturer; and (c) the actual helical or spiral length of the fluid and pressure communicating conduit or passage means 1090 is relatively long and of a length sufficient to achieve the damping required, as in a condition depicted by graph 1102 of FIG. 7, thereby providing the attendant required output or control of transducer means 10b.

FIG. 8 depicts the transducer assembly 10b (which comprises end member or housing portion 18b, the separate fitting means 36b and insert means 1048 the details of which may be as disclosed with reference to FIGS. 3, 5 and 6) operatively threadably connected, as by employing tool-engaging surface means 1110 carried by the separate fitting means 36b, to place the inlet of passage or conduit means 38b in communication with a source of oil under pressure as via conduit means 1014 of an engine 1000. When the engine 1000 is operating, the associated oil pump, as at 1002 of FIG. 1, pressurizes the oil within the oil-flow network and such pressurized oil flows into passage or conduit 38b and through the passage means or conduit means 1090 into the annulus or ring-like chamber (below head 1056 and as at 1092 of FIG. 3) from where the pressurized oil flows through the spaces provided, as for example depicted at 1070, 1072 and 1074 of FIG. 6, and into pressure chamber 34b where it acts against pressure responsive movable means or diaphragm means 24b. The diaphragm means 24b and associated elements will move upwardly (as viewed in FIG. 8) depending upon and in response to the magnitude of the pressure of such monitored pressurized oil.

Embodiments of FIGS. 9, 10, 11, 12 and 13

One form or embodiment of insert means has been disclosed as in FIGS. 3, 5, 6 and 8. FIGS. 9 and 10, fragmentarily, depicts a modified form of insert means. In FIG. 9 and 10, except as otherwise noted to the contrary, all elements of the insert means 1048-2 may be considered as being the same as that disclosed in FIGS. 3, 5 and 6 and for ease of identification those elements in FIGS. 9 and 10 which are like those of any of FIGS. 3, 5 or 6 are identified with like reference numerals provided with a suffix "2". In comparing FIGS. 6 and 9, it can be seen that the distinction therebetween resides in having all of the openings or recesses 1070-2, 1072-2 and 1074-2 of generally equal area (as viewed in FIG. 9) whereas, as shown in FIG. 6, the openings or recesses 1070 and 1072 have areas considerably larger than that of recess or opening 1074.

Figure 11:
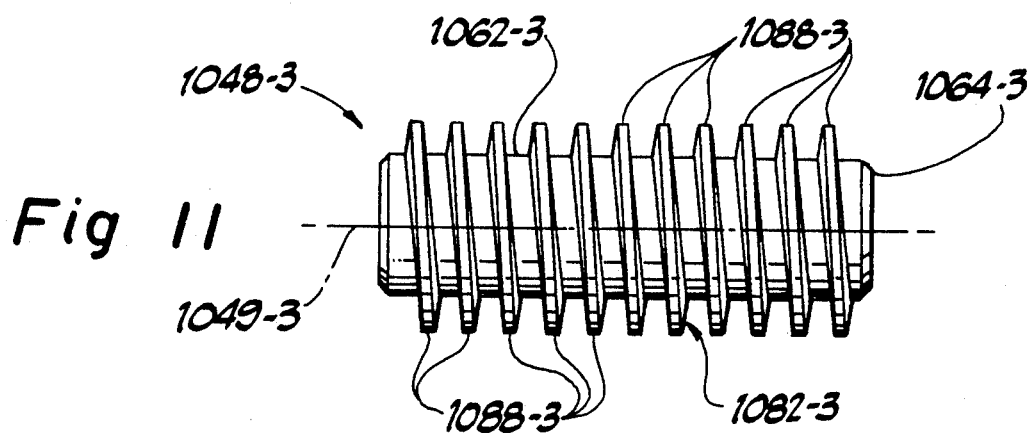
FIG. 11 is a view similar to that of FIG. 5 but illustrating another embodiment of the invention.

FIG. 11 illustrates a further embodiment of the insert means. In FIG. 11 all elements like or similar to those of any of FIGS. 3, 5 or 6 are identified with like reference numerals provided with a suffix "3". In comparing the embodiment of FIG. 11 to FIGS. 5 and 6, it can be seen that the distinction therebetween residues in that the embodiment of FIG. 11 does not employ the head or abutment portion 1056 of FIGS. 5 and 6. As in the other embodiments of the insert means, already discussed, insert means 1048-3 is preferably press-fitted into its cooperating passage as, for example, passages 1050 or 38b. If not press-fitted, other cooperating elements may be employed such as a stepped form of passage 1050 or 38b, or other elements situated generally axially of and in what may be considered the path of insert means 1048-3.

Figure 12:
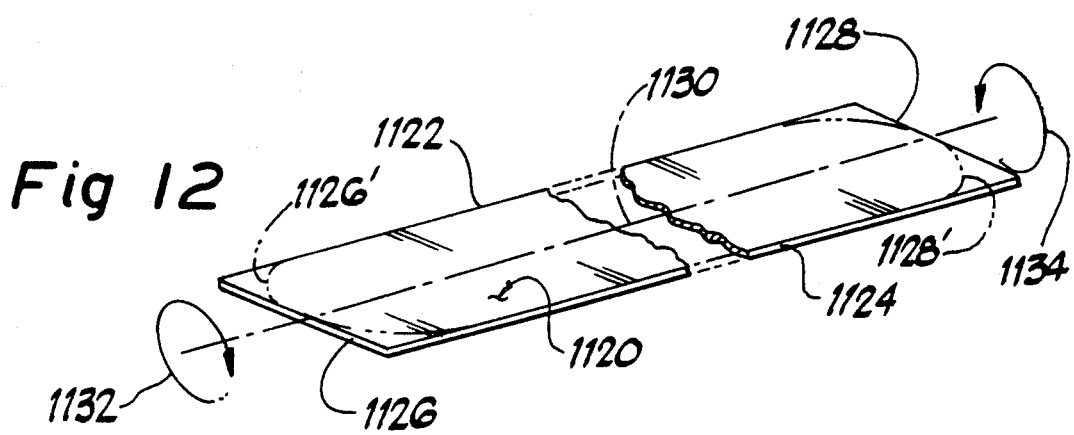
FIG. 12 is a generally perspective view of a plate-like member employable in the making of yet another embodiment of the invention.

FIGS. 12 and 13 illustrate yet another embodiment of insert means as well as another method of producing such. Referring in greater detail, FIG. 12 depicts what may be considered an elongated piece 1120 of generally flat stock material such as, for example, steel. The flat stock 1120 is shown as having oppositely disposed, preferably generally parallel, elongated side edges 1122 and 1124 and transverse oppositely disposed end edges 1126 and 1128. If desired, the end edges 1126 and/or 1128 may be: (a) normal to side edges 1122 and 1124; or (b) inclined with respect to side edges 1122 and 1124; or (c) of a contoured configuration other than straight such as, for example, arcuate. In any event, the flat stock material 1120 is twisted as about its medial longitudinal axis 1130 in relative directions as indicated by arrows 1132 and 1134. The member 1120 is thusly twisted, as by die or otherwise, to form a generally helical member, comprising insert means, as generally depicted at 1136 of FIG. 13.

In comparing the insert means 1136 of FIG. 13 and, for example, the insert means 1048-3 of FIG. 11, it can be seen that such are generally functionally equivalent. That is, insert means 1136 is illustrated as comprising a generally medially situated axially extending twisted body-like portion 1138 which by generally radiating outwardly and generally helically provides ridge-like or thread-like means 1140 progressing axially and helically along the body-like portion 1138. The radially outer surface means 1142 of the ridge-like means 1138 is also preferably formed as to lie in the trace of a right circular cylinder with at least a major portion of such outer surface means 1142, as measured generally axially, being flat as viewed in FIG. 13; i.e., substantially parallel to the central longitudinal axis of insert means 1136.

When the insert means 1136 is inserted into a cooperating conduit or passage as, for example, conduits 1052 or 38b either of which may be considered as comprising the phantom line conduit 1144, continuous generally helical passage means or conduit means 1146 are cooperatively formed by the helical ridge-like means 1140 and the juxtaposed portion of the inner cylindrical surface of passage 1144. The opposite axial ends 1148 and 1150 of insert means 1136 may be bent as to extend generally axially therefrom and as to thereby provide for ease of fluid flow into and out of each end of the passage means 1146. It should be remembered that the ends may be formed from contoured end surfaces as generally depicted in phantom line at 1126' and 1128' of FIG. 12.

The insert means 1136 of FIG. 13 differs from that of, for example, FIG. 11 in that the ridge-like means 1140 comprises a double helix with one helix having its radially outer surface means 1142 determined as from edge 1122 of FIG. 12 and the other helix having its radially outer surface means 1142 determined as from edge 1124 of FIG. 12.

Although only a preferred embodiment and a select number of modifications of the invention have been disclosed and described, it is apparent that other embodiments and modifications are possible within the scope of the appended claims.

What is claimed is:

1. A pressure responsive assembly for monitoring and responding to the magnitude of pressure of a fluid under variable pressure, comprising a pressure responsive movable wall, means for resiliently resisting the movement of said movable wall, and a conduit communicating generally between said pressure responsive movable wall and a source of said fluid under pressure being monitored, said conduit being effective for communicating said fluid under pressure from said source and to said pressure responsive movable wall, said pressure responsive movable wall being movable in response to the magnitude of the pressure of said fluid under pressure applied to said pressure responsive movable wall, and wherein said conduit is comprised of a generally helical configuration, and further comprising a housing, wherein said housing comprises a housing end wall and a separate fitting fixedly secured to and carried by said housing end wall, sealing means operatively coacting between said housing end wall and said fixedly secured fitting as to preclude fluid flow therebetween, said fitting being effective for operative connection to said source of said fluid under pressure, wherein said housing end wall with said fixedly secured fitting and said pressure responsive movable wall cooperatively define a fluid pressure chamber wherein said fixedly secured fitting has an inner end disposed toward said fluid pressure chamber and an outer end opposite to said inner end and disposed and extending away from said fluid pressure chamber, wherein said conduit further comprises a conduit portion formed in said fitting, wherein said conduit of generally helical configuration comprises an insert-like member carried by said conduit portion, and comprising an abutment carried by said insert-like member for operatively abutting against said inner end of said fixedly secured fitting, wherein said insert-like member comprises a body, said body having a longitudinal axis and extending generally therealong, a ridge-like portion carried by said body, said ridge-like portion radiating generally outwardly of said body and extending helically along said longitudinal axis, said helically extending ridge-like portion defining a helical space also extending helically along said longitudinal axis, wherein said helical space comprises said conduit of generally helical configuration, wherein said insert-like member is press-fitted into said conduit portion by engagement of said ridge-like portion with the surface comprising said conduit portion, wherein said abutment comprises an abutment portion extending generally radially outwardly of said longitudinal axis so as to extend a distance greater than the radial dimension of said ridge-like portion, and wherein said ridge-like portion does not axially extend as to be fully against said abutment portion, wherein said abutment portion carried by said insert-like member is of a generally disk-like configuration and formed integrally with said insert-like member.

2. A pressure responsive assembly according to claim 1 wherein said disk-like abutment portion spans said conduit portion, and further comprising passage means formed through said disk-like abutment portion for providing communication between said conduit of generally helical configuration and said fluid pressure chamber.

3. In combination, an automotive internal combustion piston-type engine, said engine comprising an engine oil reservoir, an oil pump, an oil conveying conduit communicating with said oil pump and leading to portions of said engine remote from said oil pump, said oil pump being effective to pump said oil from said engine oil reservoir and through said oil conveying conduit at superatmospheric pressure, a pressure transducer assembly for monitoring the magnitude of pressure of said oil in said oil conveying conduit and responding thereto by varying the magnitude of electrical resistance in an associated electrical circuit, said pressure transducer assembly comprising a pressure responsive movable wall, a second conduit communicating generally between said pressure responsive movable wall and a source of said oil flowing through said oil conveying conduit at superatmospheric pressure, said second conduit being effective for communicating said oil under superatmospheric pressure to said pressure responsive wall, said pressure responsive movable wall being movable in response to the magnitude of said superatmospheric pressure of said oil under superatmospheric pressure applied to said pressure responsive movable wall, resilient means for resiliently resisting the movement of said pressure responsive wall, wherein said second conduit comprises a passage of generally helical configuration, said pressure transducer assembly further comprising a body, said body having a longitudinal axis and extending generally therealong, a ridge-like portion carried by said body, said ridge-like portion radiating generally outwardly of said body and extending helically along said longitudinal axis, said helically extending ridge-like portion defining a helical space also extending helically along said longitudinal axis, wherein said helical space comprises said passage of generally helical configuration, wherein said pressure transducer assembly comprises a housing, wherein a portion of said housing and said pressure responsive movable wall cooperatively define a fluid pressure chamber, wherein said portion of said housing comprises inner disposed surface means effectively facing said pressure chamber, wherein said second conduit further comprises a conduit portion formed in said portion of said housing, wherein said body and said radiating ridge-like portion are carried in said conduit portion, wherein said body further comprises an abutment carried thereby, said abutment being situated generally at one axial end of said helically extending ridge-like portion, said abutment comprising at least one abutment portion extending generally radially outwardly of said longitudinal axis so as to extend a distance greater than the radial dimension of said helically extending ridge-like portion, and wherein said at least one abutment portion is operatively abutably engaged against said inner disposed surface means of said portion of said housing, wherein said abutment further comprises a radially enlarged head extending transversely of said longitudinal axis, wherein said head comprises said at least one abutment portion and further comprises at least a second abutment portion for operative abutable engagement against said inner disposed surface means of said housing, and wherein said head further comprises an additional passage formed in said head to provide for flow through said additional passage of said oil into and out of said fluid pressure chamber.

4. The combination according to claim 3 wherein said head is integrally formed with said body carrying said helically extending ridge-like portion.

5. In combination, an automotive internal combustion piston-type engine, said engine comprising an engine oil reservoir, an oil pump, an oil conveying conduit communicating with said oil pump and leading to portions of said engine remote from said oil pump, said oil pump being effective to pump said oil from said engine oil reservoir and through said oil conveying conduit at superatmospheric pressure, a pressure transducer assembly for monitoring the magnitude of pressure of said oil in said oil conveying conduit and responding thereto by varying the magnitude of electrical resistance in an associated electrical circuit, said pressure transducer assembly comprising a pressure responsive movable wall, a second conduit communicating generally between said pressure responsive movable wall and a source of said oil flowing through said oil conveying conduit at superatmospheric pressure, said second conduit being effective for communicating said oil under superatmospheric pressure to said pressure responsive wall, said pressure responsive movable wall being movable in response to the magnitude of said superatmospheric pressure of said oil under superatmospheric pressure applied to said pressure responsive movable wall, resilient means for resiliently resisting the movement of said pressure responsive wall, wherein said second conduit comprises a passage of generally helical configuration, said pressure transducer assembly further comprising a body, said body having a longitudinal axis and extending generally therealong, a ridge-like portion carried by said body, said ridge-like portion radiating generally outwardly of said body and extending helically along said longitudinal axis, said helically extending ridge-like portion defining a helical space also extending helically along said longitudinal axis, wherein said helical space comprises said passage of generally helical configuration, wherein said pressure transducer assembly comprises a housing, wherein a portion of said housing and said pressure responsive movable wall cooperatively define a fluid pressure chamber, wherein said portion of said housing comprises inner disposed surface means effectively facing said pressure chamber, wherein said second conduit further comprises a conduit portion formed in said portion of said housing, wherein said body and said radiating ridge-like portion are carried in said conduit portion, wherein said body further comprises an abutment carried thereby, said abutment being situated generally at one axial end of said helically extending ridge-like portion, said abutment comprising at least one abutment portion extending generally radially outwardly of said longitudinal axis so as to extend a distance greater than the radial dimension of said helically extending ridge-like portion, and wherein said at least one abutment portion is operatively abutably engaged against said inner disposed surface means of said portion of said housing, wherein said housing comprises an integrally formed axially extending housing extension, wherein said second conduit extends generally through said axially extending housing extension.

6. The combination according to claim 5 wherein said abutment is integrally formed with said body.

7. In combination, an automotive internal combustion piston-type engine, said engine comprising an engine oil reservoir, an oil pump, an oil conveying conduit communicating with said oil pump and leading to portions of said engine remote from said oil pump, said oil pump being effective to pump said oil from said engine oil reservoir and through said oil conveying conduit at superatmospheric pressure, a pressure transducer assembly for monitoring the magnitude of pressure of said oil in said oil conveying conduit and responding thereto by varying the magnitude of electrical resistance in an associated electrical circuit, said pressure transducer assembly comprising a pressure responsive movable wall, a second conduit communicating generally between said pressure responsive movable wall and a source of said oil flowing through said oil conveying conduit at superatmospheric pressure, said second conduit being effective for communicating said oil under superatmospheric pressure to said pressure responsive wall, said pressure responsive movable wall being movable in response to the magnitude of said superatmospheric pressure of said oil under superatmospheric pressure applied to said pressure responsive movable wall, resilient means for resiliently resisting the movement of said pressure responsive wall, wherein said second conduit comprises a passage of generally helical configuration, said pressure transducer assembly further comprising a body, said body having a longitudinal axis and extending generally therealong, a ridge-like portion carried by said body, said ridge-like portion radiating generally outwardly of said body and extending helically along said longitudinal axis, said helically extending ridge-like portion defining a helical space also extending helically along said longitudinal axis, wherein said helical space comprises said passage of generally helical configuration, wherein said pressure transducer assembly comprises a housing, wherein a portion of said housing and said pressure responsive movable wall cooperatively define a fluid pressure chamber, wherein said portion of said housing comprises inner disposed surface means effectively facing said pressure chamber, wherein said second conduit further comprises a conduit portion formed in said portion of said housing, wherein said body and said radiating ridge-like portion are carried in said conduit portion, wherein said body further comprises an abutment carried thereby, said abutment being situated generally at one axial end of said helically extending ridge-like portion, said abutment comprising at least one abutment portion extending generally radially outwardly of said longitudinal axis so as to extend a distance greater than the radial dimension of said helically extending ridge-like portion, and wherein said at least one abutment portion is operatively abutably engaged against said inner disposed surface means of said portion of said housing, wherein said abutment comprises a radially enlarged head extending transversely of said longitudinal axis, wherein said head comprises said at least one abutment portion and further comprises at least a second abutment portion for operative abutable engagement against a further coacting surface of said fluid pressure chamber, and wherein said head further comprises an additional passage formed in said head to provide for flow of said oil through said additional passage into and out of said fluid pressure chamber.

8. A pressure responsive assembly for monitoring and responding to the magnitude of pressure of a fluid under variable pressure, comprising a pressure responsive movable wall, means for resiliently resisting the movement of said movable wall, and a conduit communicating generally between said pressure responsive movable wall and a source of said fluid under pressure being monitored, said conduit being effective for communicating said fluid under pressure from said source and to said pressure responsive movable wall, said pressure responsive movable wall being movable in response to the magnitude of the pressure of said fluid under pressure applied to said pressure responsive movable wall, and wherein said conduit is comprised of a generally helical configuration, a body, said body having a longitudinal axis and extending generally therealong, a ridge-like portion carried by said body, said ridge-like portion radiating generally outwardly of said body and extending helically along said longitudinal axis, said helically extending ridge-like portion defining a helical space also extending helically along said longitudinal axis, wherein said helical space comprises said conduit of generally helical configuration, wherein said pressure responsive movable wall is movable generally along an axis of movement, wherein said axis of movement and said longitudinal axis are in general alignment with each other, and further comprising a housing, wherein said housing comprises a housing end wall, wherein said housing end wall and said pressure responsive movable wall cooperatively define a fluid pressure chamber, wherein said conduit further comprises a conduit portion formed in said housing end wall, wherein said pressure responsive movable wall comprises a diaphragm, wherein an outer peripheral portion of said diaphragm is fixedly secured to said housing, wherein a generally inner portion of said diaphragm situated inwardly of said peripheral portion is movable in directions generally along said axis of movement, wherein said body further comprises an abutment carried by said body, said abutment being situated generally at one axial end of said helically extending ridge-like portion, said abutment comprising at least one abutment portion extending generally radially outwardly of said longitudinal axis so as to extend a distance greater than the radial dimension of said helically extending ridge-like portion, and wherein said at least one abutment portion is operatively abutably engaged against said housing.

9. A pressure responsive assembly according to claim 8 wherein said at least one abutment portion operatively abutably engages against said housing by engaging a surface of said fluid pressure chamber.

10. A pressure responsive assembly according to claim 9 and further comprising a locking portion engaging said at least one abutment portion as to thereby contain said at least one abutment portion generally between said locking portion and said surface of said fluid pressure chamber.

11. A pressure responsive assembly according to claim 8 and further comprising a passage formed in said at least one abutment portion to provide for flow through said passage of said fluid into and out of said fluid pressure chamber.

12. A pressure responsive assembly according to claim 8 wherein said abutment further comprises a radially enlarged head extending transversely of said longitudinal axis, wherein said head comprises said at least one abutment portion, and wherein said ridge-like portion terminates at an axial location of said body as to be axially spaced from said at lest one abutment portion.

* * * * *

UNITED STATES PATENT AND TRADEMARK OFFICE
CERTIFICATE OF CORRECTION

PATENT NO. : 5,228,334

DATED : July 20, 1993

INVENTOR(S) : JOHN R. STONE

It is certified that error appears in the above-identified patent and that said Letters Patent is hereby corrected as shown below:

On the title page, Item [56]:
In the column "References Cited, U.S. Patent Documents" add --- 1,622,843  3/1927  Price et al ---.

In the column "References Cited, U.S. Patent Documents" change "4,079,278" to --- 4,079,351 ---.

Column 6, line 65, before "chamber" cancel "present" and substitute therefor --- pressure ---.

Column 9, line 21, between "be" and "outer" insert --- either a very close slip fit or a press-fit as between the ---.

Column 10, line 18, between "art" and "engine" insert --- pressure transducer is operatively connected to a source of ---.

Column 13, line 68, between "clip" and "in" insert --- 62 ---.

UNITED STATES PATENT AND TRADEMARK OFFICE
CERTIFICATE OF CORRECTION

PATENT NO. : 5,228,334
DATED : July 20, 1993
INVENTOR(S) : JOHN R. STONE It is certified that error appears in the above-identified patent and that said Letters Patent is hereby corrected as shown below:

Column 14, line 36, after "78b" change "is" to --- of ---.

Column 14, line 44, change "busing" to --- bushing ---.

Column 17, line 41, change "residues" to --- resides ---.

Signed and Sealed this

First Day of March, 1994

BRUCE LEHMAN

*Attest:*

*Attesting Officer*        *Commissioner of Patents and Trademarks*